Sept. 24, 1935.   C. E. JOHNSON   2,015,273
PISTON SPREADER
Filed Dec. 10, 1934

Inventor
Charles E. Johnson
By Lawrence and
Van Antwerp
Attorneys

Patented Sept. 24, 1935

2,015,273

UNITED STATES PATENT OFFICE 2,015,273

PISTON SPREADER

Charles E. Johnson, North Muskegon, Mich., assignor to Sealed Power Corporation, Muskegon, Mich., a corporation of Michigan Application December 10, 1934, Serial No. 756,723

4 Claims. (Cl. 309—12)

This invention relates to an expanding device and more particularly to a piston spreader.

It is oftentimes desirable to expand pistons and one main object of my invention is to provide an expansion device of simple construction whereby the piston may be expanded to any desired degree and yet when expanded remains flexible at the skirt.

Briefly described, my invention consists of a cylindrical resilient body member having extensions thereon which fit into an axial slot in the wall of a piston and means is introduced within said cylindrical body for expanding the same and causing the extensions thereon to move apart the desired amount by flexible prongs cut from said resilient body.

Another advantage resides in the integral construction of my body member, the prongs extending angularly inward from its walls. The prongs serve three functions. First, they cooperate with the expanding bolt to expand the body member, second, they prevent accidental release of the expanding bolt, and third they form the resilient means of my expander connected with the body.

Other objects and advantages will become apparent as the description proceeds.

In the drawing:—

Like numerals refer to like parts throughout the several views.

Figure 1:
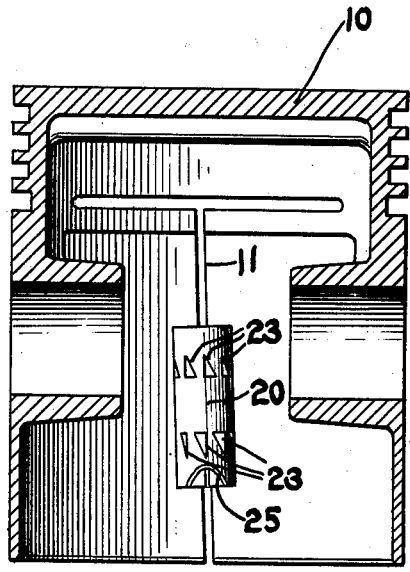
Fig. 1 is a sectional view of a piston having my expander applied thereto.

Referring to the drawing, numeral 10 indicates a piston having a slot 11 therein.

The expanding device consists of a curved body member 20 formed of resilient material and having spaced arms or extensions 21 integrally formed therewith. These arms have their edges sharpened or serrated as indicated at 22 and thus securely engage the sides of the slot 11. See Figs. 2 and 4.

Figure 4:
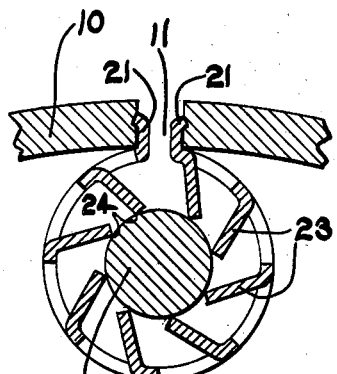
Fig. 4 is a sectional view looking along the line 4—4 of Fig. 2.
Figure 2:
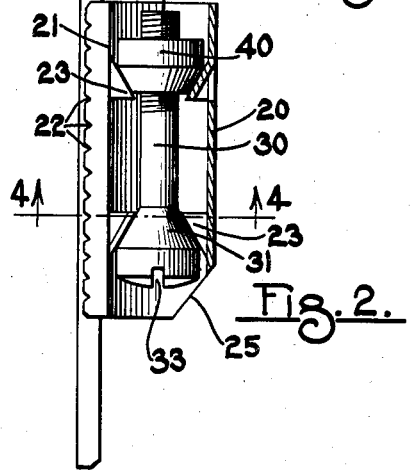
Fig. 2 is a sectional view taken along the line 2—2 of Fig. 3.
Figure 3:
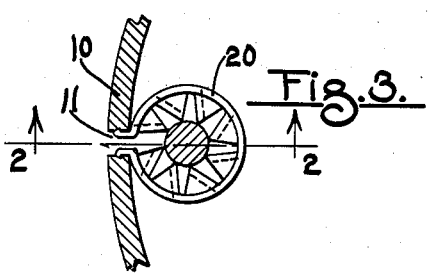
Fig. 3 is a plan view of Fig. 2.

The body member 20 has triangularly shaped portions 23 struck inwardly as shown in Figs. 1, 2 and 4. These portions are in two alined planes and each of them is adapted to have a corner, indicated at 24, engage the conical portion of a head and nut of a bolt, as hereafter described. The lower row of these prongs extends oppositely to the upper row thereof for a purpose to be later described.

A bolt 30, has a conically shaped surface 21 thereon (see Fig. 2) and is threaded at 32 in order to receive the conically shaped nut 40 thereon. A slot 33 is formed and receives the adjusting tool whereby expansion of the body member 20 is had. The body member 20 is cut away as indicated at 25 in order to give clearance for the piston connecting rod when the rod is at the side of the piston where the expander is located.

As shown in Fig. 2, a screw driver may be inserted in the slot 33 and the bolt 30 rotated. This causes the nut 40 and its conical wedging surface to move toward the head and over the conical wedging surfaces 31. These wedging surfaces engage the prongs 23 and push the arms 21 apart and thus expand the piston to the desired degree. The prongs 23, (see Fig. 4) are so arranged as to cause the corners 24 to bite into the bolt head and the nut and hold the same against retrograde movement.

I claim:

1. A spreader of the class described comprising, a curved body member of substantially cylindrical shape having two projections extending substantially in parallelism therefrom, integral spring means extending inwardly from said cylindrical body, said body being free to expand and contract through said integral spring means, and extension means cooperatively associated with said integral spring means for the purpose described.

2. A piston expander of the class described, consisting of, a substantially cylindrical body member formed of resilient metal, said body member having a slit therein whereby the said body member may be expanded, integral spring means extending inwardly from the said body member, and wedging means associated with said integral spring means, whereby the body member is expanded to the desired degree.

3. A device as set forth in claim 2 in which said integral spring means has means thereon adapted to prevent movement of the wedging means in one direction, for the purpose described.

4. An article of manufacture consisting of, a body member of curved construction having a plurality of portions struck inwardly therefrom, said body member being slit at one side, arms on the body member adjacent the slotted portion, whereby expansion of the body member radially causes separation of these arms, and means extending axially of the body member to contact the inwardly struck portions for the purpose described.

CHARLES E. JOHNSON.